Jan. 17, 1961 N. GOROS 2,968,560
INFUSION PACKAGE FOR PRODUCING A COFFEE BEVERAGE
Filed Feb. 6, 1959
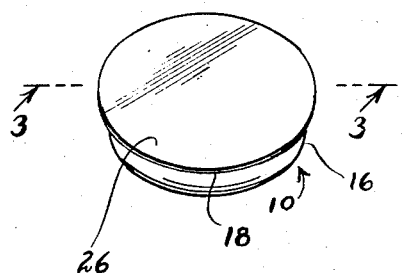
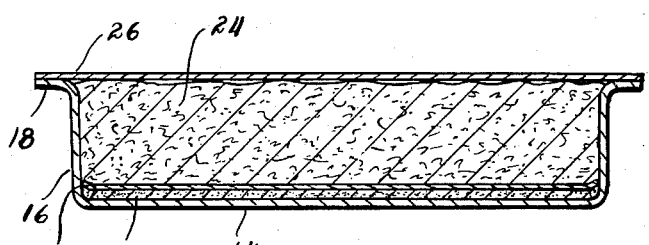
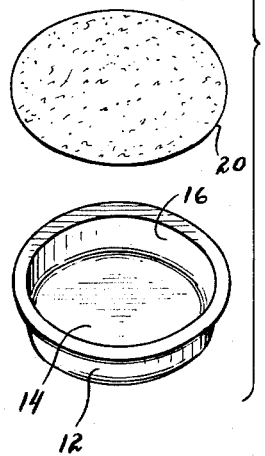
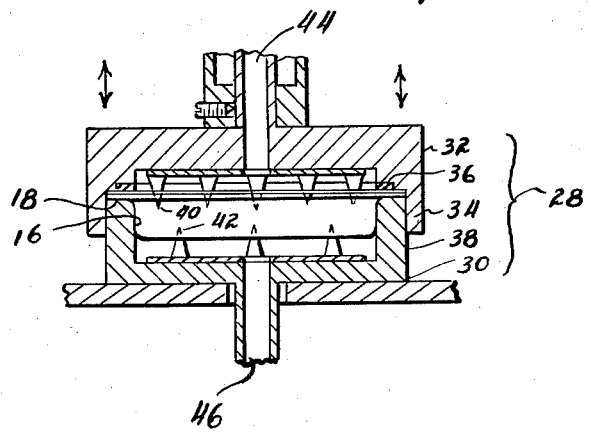
INVENTOR.
NATHAN GOROS
BY
ATTORNEYS United States Patent Office 2,968,560
Patented Jan. 17, 1961

2,968,560

INFUSION PACKAGE FOR PRODUCING A COFFEE BEVERAGE

Nathan Goros, New York, N.Y., assignor to Sealpak Corporation, Bronx, N.Y., a corporation of New York Filed Feb. 6, 1959, Ser. No. 791,621

5 Claims. (Cl. 99—77.1)

This invention relates to a container containing coffee grounds and a dehydrated dairy product separated from the coffee by a porous member and to an improved method of extracting therefrom an infusion product of coffee with the dairy product thoroughly dissolved and mixed therein.

Present methods of creaming coffee such as metering dehydrated dairy products into a coffee solution in automatic vending machines are not entirely satisfactory. Such dairy products are difficult to completely dissolve and mix. Such dairy products have an inherent tendency to coagulate within the lines, storage compartments and metering devices, making the equipment inoperative and causing service and sanitation problems.

I have found that mixing the dehydrated dairy product with the coffee grounds or placing the dairy product in direct contact with the coffee grounds in an infuser is not satisfactory. During the process of infusion by hot water, the dairy product effectively coats the coffee grounds preventing the extraction therefrom of a coffee beverage having the desired body, aroma and bouquet.

It is, therefore, one object of my invention to provide a container containing coffee and a dehydrated dairy product separated from the coffee by a porous separator.

It is a further object of my invention to provide an improved method for the extraction of a coffee beverage having the desired body, aroma and bouquet into which a dairy product has been thoroughly dissolved.

Further objects and advantages of this invention appear hereinafter.

A preferred embodiment is illustrated in the accompanying drawings of which:

Figure 1 is a perspective view of a container embodying this invention.

Figure 2 is an exploded view of the elements of the container shown in Figure 1.

Figure 3 is a cross-section of the container shown in Figure 1; and

Figure 4 is a partially sectioned view of an infusion device with the container of Figure 1 in place therein.

In one embodiment of this invention there is provided a container or infuser comprising a frangible body separated into a first and second compartment by a porous separator. Ground coffee is contained in the first compartment and powdered cream in the second. The container is hermetically sealed by a closure across the filling opening thereof.

In accordance with the method of extracting a creamed infusion liquid from said container, hot water is allowed to enter the compartment containing the coffee for infusion thereof. This liquid coffee infusion then passes through the separator into the compartment containing the powdered cream. The powdered cream is then thoroughly dissolved by and mixed with the coffee infusion.

Referring to Figures 1–3, the infuser 10 comprises a cup-like body 12 which is shown as being circular but may be made in various shapes as is desired. The body has a bottom wall 14 which extends in a flat plane and annular side wall 16 integral with the bottom wall 14, which side wall extends upwardly therefrom and has an annular flange 18 on the upper edge thereof substantially parallel to the bottom wall 14. The body may be made by the usual drawing, forging, or molding operation from suitable material compatible with the food products contained therein and capable of withstanding the temperature of the extraction liquid such as hot or boiling water. The material must also withstand the pressure required to infuse the food product in the manner to be explained and must be of such nature as to be readily formed in the desired shape by practical machine process.

I have discovered that aluminum foil of three thousandths inch thickness is suitable for making the above described body.

A porous disk 20 separates the body into compartments 22 and 24. A metered amount of a dehydrated dairy product is contained within compartment 22 and a metered amount of ground coffee is contained within compartment 24. By a dehydrated dairy product is meant dehydrated milk, cream, or combinations thereof with the necessary added ingredients, commercially available and usually known as powdered cream. A closure 26 is placed across the filling opening of the body. This closure is preferably formed of the same material as the body portion. The closure is then hermetically sealed to the annular flange of the body portion to preserve the aroma and freshness of the food products contained therein.

The porous separator is preferably formed from a fibrous material which will not dissolve in the hot water used to infuse the coffee. I have found that cellulose base material such as a rayon paper is particularly suitable for this separator. As an example, the paper sold by the Aldine Paper Company under the designations Rayon Aldex PR 461-3-12 has been satisfactory.

The porous separator is die cut so that it contacts the side wall 16 of the container around its entire periphery to physically separate the coffee and cream in the first and second compartments respectively. In practice, the separator is cut with the same diameter as the inside of the side wall, since it has been found that the bevel of the flange 18 is sufficient to guide the separator into place after the separator is placed therein. The flexibility of the porous separator adequately adjusts for differences in the diameter of the side wall caused by manufacturing tolerances.

The container is adapted to easy automatic filling. After injection of a metered quantity of powdered cream, the separator is then placed on the cream and a metered quantity of ground coffee is placed on the separator. The closure is then applied and hermetically sealed, thus providing good shelf life to the food products in the infuser. The closure may be hermetically sealed to the flange by any of the means known to the art, such as the use of a thermoplastic coated foil, heat sealed together as is more particularly described in the U.S. Patent No. 2,778,739 entitled Package for Beverage Infusion Material. The cream and coffee may be metered by equipment known to the art. The disc insertion may be manual or automatic. For automatic insertion, equipment such as the Fulton Disc Applicator made by the Fulton Engineering Company may be employed.

The sealed infuser then acts as an effective vapor barrier sealing in flavor, aroma and freshness, while protecting the contents from harmful external elements such as humidity and odors. Extended shelf life is thereby provided. The infuser is particularly adaptable for use in combination with the apparatus shown in Figure 4.

The apparatus shown in Figure 4 comprises a housing designated generally 28 which is composed of lower and upper telescopically related sections 30 and 32 respectively. The upper section 32 of cup-like formation has a downwardly depending annular wall 34 having an annular seal 36. The lower section 30 has an upwardly depending annular wall 38 adapted to telescope with the upper section in snug relationship thereto. The infuser 10 is placed between the two sections and the sections brought together into operating engagement. The flange 18 extends in sealed relationship between the top edge of the bottom wall 38 and the annular resilient seal 36. Piercing means 40 and 42 on the upper and lower sections respectively pierce the infuser to provide a passage for the infusion liquid therethrough. For details of such apparatus, reference is made to application, Serial No. 504,042, filed April 26, 1955, by J. J. Rodth for Beverage Apparatus, now Patent No. 2,899,886. The inlet 44 is connected to a suitable liquid source (not shown), such as water at or near the boiling point, which is controlled by a suitable valve mechanism (not shown), to admit a metered quantity of water to infuse the coffee and cream. The water will pass through the openings in the top of the infuser and out through the opening in the bottom wall as a solution extraction of the contents of the infuser. The solution will pass through the outlet 46 into some receptacle (not shown). As an alternative to the apparatus shown in Figure 4 and by reference to the co-pending application, a simple manually operated apparatus might also be employed advantageously.

During the passage of the water into the infuser the separator will, on the one hand, prevent turbulence of the infusing liquid from stirring up the powdered cream and thereby coating the coffee with the cream, which condition has been found to prevent proper coffee infusion. On the other hand, however, the porous separator will not prevent free flow of the liquid coffee infusion from the compartment 24 into the compartment 22 to dissolve the powdered cream therein.

It will be apparent to those skilled in the art that the water flow may be horizontal as well as vertical but must flow from the coffee into the cream. By this method, I have found that, not only do I prevent the coating of the coffee by the cream, but I provide a method for the complete dissolving and dispersing of the cream within the liquid coffee to give a creamed coffee having the desired body, aroma and bouquet wherein the powdered cream is thoroughly homogenized.

The container can be made in various sizes for dispensing a single cup of coffee or a number of cups of coffee as desired and may be used in home or restaurant coffee makers.

It will be understood that the invention may be variously modified and embodied within the scope of the subjoined claims.

What is claimed is:
1. The method of making liquid coffee from ground coffee and a dehydrated dairy product which comprises separating the coffee from the dairy product by a porous separator and flowing hot water first through the coffee and then through the dairy product.

2. An infuser for the production of a coffee beverage comprising a frangible cup-like body having a bottom wall and an integral side wall extending upwardly from the periphery of the bottom wall, a porous separator dimensioned to peripherally contact said side wall to divide the body into a first and second compartment, ground coffee stored in said first compartment, a dehydrated dairy product stored in said second compartment, and a frangible closure extending across the periphery of said side wall.

3. An infuser according to claim 2 in which said closure is hermetically sealed to the periphery of said side wall.

4. An infuser for the production of a coffee beverage by passing hot water therethrough comprising a frangible body portion having a bottom wall, a porous separator, said separator dividing said body portion into a first and second compartment, ground coffee stored in said first compartment, a dehydrated dairy product stored in said second compartment, said body portion contacting the periphery of said separator to cause the liquid flow from said first compartment to pass through said separator and into said second compartment, and a frangible closure member to retain said stored product with said infuser.

5. A container for the production of a creamed coffee beverage comprising a frangible cup-like body having a bottom wall and an integral side wall extending upwardly from the periphery of the bottom wall, a flange extending in a plane from the periphery of said side wall, a porous separator dimensioned to peripherally contact said side wall to divide the body into a first compartment and a second compartment, ground coffee stored in said first compartment, a dehydrated dairy product stored in said second compartment, and a closure extending across and hermetically sealed to said flange.

References Cited in the file of this patent

UNITED STATES PATENTS

| | | |
|---|---|---|
| 1,077,835 | Kelly | Nov. 4, 1913 |
| 1,377,316 | Clermont | May 10, 1921 |
| 1,931,765 | Leever | Oct. 24, 1933 |
| 2,451,195 | Brown | Oct. 12, 1948 |
| 2,778,739 | Rodth | Jan. 22, 1957 |